United States Patent
Miyake et al.

(10) Patent No.: US 10,415,527 B2
(45) Date of Patent: Sep. 17, 2019

(54) FUEL INJECTION VALVE

(71) Applicant: HITACHI AUTOMOTIVE SYSTEMS, LTD., Hitachinaka-shi, Ibaraki (JP)

(72) Inventors: Takao Miyake, Hitachinaka (JP); Atsushi Nakai, Hitachinaka (JP); Kiyotaka Ogura, Hitachinaka (JP); Akira Iizuka, Hitachinaka (JP)

(73) Assignee: HITACHI AUTOMOTIVE SYSTEMS, LTD., Hitachinaka-Shi, Ibaraki (JP)

(*) Notice: Subject to any disclaimer, the term of this patent is extended or adjusted under 35 U.S.C. 154(b) by 8 days.

(21) Appl. No.: 15/547,198

(22) PCT Filed: Jan. 12, 2016

(86) PCT No.: PCT/JP2016/050607
§ 371 (c)(1),
(2) Date: Jul. 28, 2017

(87) PCT Pub. No.: WO2016/121475
PCT Pub. Date: Aug. 4, 2016

(65) Prior Publication Data
US 2018/0010564 A1    Jan. 11, 2018

(30) Foreign Application Priority Data

Jan. 30, 2015    (JP) .................... 2015-016302

(51) Int. Cl.
*F02M 61/00* (2006.01)
*F02M 61/18* (2006.01)
*F16K 1/42* (2006.01)

(52) U.S. Cl.
CPC .......... *F02M 61/18* (2013.01); *F02M 61/188* (2013.01); *F16K 1/427* (2013.01)

(58) Field of Classification Search
CPC .......................................... F16K 1/42
(Continued)

(56) References Cited

U.S. PATENT DOCUMENTS

| 2,793,079 | A | * | 5/1957 | La Haye | F02M 47/00 239/124 |
| 2,951,647 | A | * | 9/1960 | Dreisin | F02M 61/06 235/1 R |

(Continued)

FOREIGN PATENT DOCUMENTS

| DE | 10 2006 052 817 A1 | 5/2008 |
| EP | 2 439 400 A1 | 4/2012 |

(Continued)

OTHER PUBLICATIONS

"Spherical Segment" http://mathworld.wolfram.com/SphericalSegment.html.*

(Continued)

*Primary Examiner* — Viet Le
(74) *Attorney, Agent, or Firm* — Foley & Lardner LLP (57) ABSTRACT

Recent exhaust gas regulation requires reduction of an amount and quantity of particulate matter included in an exhaust gas, and a normal maximum fuel pressure may be increased to approximately 35 MP. When the normal maximum fuel pressure is 35 MPa, a fuel injection valve is required to work for example at a pressure up to 45 MPa. In such a condition, a fluid force may exceed a valve opening force depending on a seat diameter, and a needle valve cannot be kept open and closed, when opening thereof is required.
In order to solve the above problems, a fuel injection valve according to the present invention includes a valve seat portion, a valve body which is seated on or separated from the valve seat portion, an injection hole which is formed on a downstream side from the valve seat portion, and a guide (Continued)

portion which is formed on an upstream side from the valve seat portion seating a valve body seat portion of the valve body to guide a guided portion on a downstream side of the valve body, in which the valve seat portion is formed to have a dimension in a crossing direction crossing an axial direction of 0.4 to 0.8 times a dimension of the guide portion in the crossing direction.

10 Claims, 6 Drawing Sheets

(58) Field of Classification Search
USPC ....... 239/533.1–533.15, 583–585.5; 251/333
See application file for complete search history.

(56) References Cited

U.S. PATENT DOCUMENTS

| | | | |
|---|---|---|---|
| 2,985,378 A * | 5/1961 | Falberg | F02M 47/02 239/584 |
| 3,387,790 A * | 6/1968 | De Luca | F02M 61/042 239/453 |
| 3,598,314 A * | 8/1971 | Bailey | F02M 61/042 239/533.11 |
| 3,736,640 A * | 6/1973 | Freiheit | B21J 15/50 251/365 |
| 3,738,578 A * | 6/1973 | Farrell | F02M 51/0614 239/585.4 |
| 3,876,152 A * | 4/1975 | Roosa | F02M 61/10 239/533.11 |
| 3,908,911 A * | 9/1975 | Hofmann | F02M 61/14 239/533.3 |
| 3,913,537 A * | 10/1975 | Ziesche | F02D 41/3005 123/484 |
| 3,980,237 A * | 9/1976 | Parrish, Jr. | F02M 61/10 239/533.3 |
| 4,030,668 A * | 6/1977 | Kiwior | F02M 51/005 239/568 |
| 4,153,205 A * | 5/1979 | Parrish, Jr. | F02M 61/18 239/533.12 |
| 4,487,369 A * | 12/1984 | Du Rocher | F02M 51/065 239/488 |
| 4,627,571 A * | 12/1986 | Kato | F02M 47/02 123/467 |
| 4,651,926 A * | 3/1987 | Sasao | B24B 39/02 239/585.1 |
| 5,127,585 A * | 7/1992 | Mesenich | F02M 45/08 239/585.3 |
| 5,385,305 A | 1/1995 | Rock et al. | |
| 5,516,047 A * | 5/1996 | Kubach | F02M 51/0671 239/585.1 |
| 5,609,304 A * | 3/1997 | Sasao | F02B 61/02 239/585.4 |
| 5,749,527 A * | 5/1998 | Fujikawa | F02M 51/0635 239/585.3 |
| 5,762,272 A * | 6/1998 | Tani | F02M 51/0678 239/543 |
| 5,931,391 A * | 8/1999 | Tani | F02M 51/0671 239/522 |
| 5,996,912 A * | 12/1999 | Ren | F02M 51/0667 239/585.5 |
| 6,017,489 A * | 1/2000 | Woolf | B22F 3/16 419/26 |
| 6,247,452 B1 * | 6/2001 | Dittus | F02M 47/027 123/458 |
| 6,330,981 B1 * | 12/2001 | Nally, Jr. | F02M 61/162 239/533.12 |
| 6,502,761 B1 * | 1/2003 | Pace | F02M 61/1806 239/5 |
| 6,675,994 B2 * | 1/2004 | Yamamoto | B05B 1/304 222/509 |
| 6,742,727 B1 * | 6/2004 | Peterson, Jr. | F02M 61/1853 239/533.11 |
| 6,789,783 B2 * | 9/2004 | Boecking | F02M 61/18 239/585.5 |
| 6,817,545 B2 * | 11/2004 | Xu | F02M 61/1806 239/533.12 |
| 7,249,722 B2 * | 7/2007 | Cibotti | F02M 45/08 123/299 |
| 7,614,604 B2 * | 11/2009 | Akabane | F02M 51/0664 239/585.4 |
| 7,832,660 B2 * | 11/2010 | Imoehl | F02M 61/168 239/533.12 |
| 8,882,003 B2 * | 11/2014 | Okamoto | F02M 61/186 239/468 |
| 8,919,675 B2 * | 12/2014 | Sakata | F02M 61/1806 239/5 |
| 8,919,677 B2 * | 12/2014 | Soteriou | F02M 61/06 239/533.3 |
| 9,657,701 B2 * | 5/2017 | Kato | F02M 61/1886 |
| 2001/0030249 A1 | 10/2001 | Nagasaka | F02M 61/18 239/585.1 |
| 2002/0079386 A1 * | 6/2002 | Bonse | F02M 61/10 239/533.9 |
| 2002/0162906 A1 * | 11/2002 | Hockenberger | F02M 61/047 239/533.12 |
| 2002/0179743 A1 * | 12/2002 | Haeberer | F02M 61/047 239/533.12 |
| 2002/0179748 A1 * | 12/2002 | Dantes | F02M 45/086 239/585.4 |
| 2003/0094517 A1 * | 5/2003 | Kato | F02M 45/08 239/585.1 |
| 2004/0046063 A1 * | 3/2004 | Heyse | F02M 51/0671 239/533.12 |
| 2004/0056119 A1 * | 3/2004 | Fath | F02M 61/18 239/533.12 |
| 2005/0178860 A1 * | 8/2005 | Christ | F02M 61/042 239/533.12 |
| 2005/0252996 A1 * | 11/2005 | Nozaki | F02M 61/18 239/533.3 |
| 2006/0102753 A1 * | 5/2006 | Tanaka | F02M 61/166 239/533.2 |
| 2006/0113406 A1 * | 6/2006 | Ganser | F02M 61/16 239/533.2 |
| 2006/0157594 A1 * | 7/2006 | Cooke | F02M 45/086 239/533.11 |
| 2007/0200011 A1 * | 8/2007 | Ibrahim | F02M 47/027 239/533.2 |
| 2008/0149744 A1 | 6/2008 | Mueller | |
| 2008/0296414 A1 * | 12/2008 | Kubota | F02M 51/0675 239/533.11 |
| 2009/0050717 A1 * | 2/2009 | Takase | F02M 61/1886 239/533.12 |
| 2009/0236448 A1 * | 9/2009 | Burkhard | F02M 61/165 239/575 |
| 2009/0242670 A1 * | 10/2009 | Kato | F02M 51/0671 239/584 |
| 2010/0001101 A1 * | 1/2010 | Leuteritz | B05B 1/083 239/533.3 |
| 2010/0102146 A1 * | 4/2010 | Kitagawa | F02M 61/12 239/584 |
| 2010/0140380 A1 * | 6/2010 | Gruendl | F02M 51/0621 239/585.3 |
| 2010/0155507 A1 * | 6/2010 | Kitagawa | F02M 61/1893 239/533.12 |
| 2010/0288857 A1 * | 11/2010 | Hashii | F02M 51/0682 239/585.1 |
| 2011/0042491 A1 * | 2/2011 | Abe | F02M 61/188 239/584 |
| 2011/0042605 A1 * | 2/2011 | Gyger | F16K 1/42 251/333 |
| 2011/0297867 A1 * | 12/2011 | Chowdhury | F01D 17/145 251/333 |
| 2012/0298903 A1 * | 11/2012 | Scherer | F16K 1/14 251/333 |
| 2012/0318883 A1 * | 12/2012 | Kusakabe | F02D 41/20 239/1 |
| 2013/0095398 A1 * | 4/2013 | Kato | G05D 16/2093 429/415 |

(56) References Cited

U.S. PATENT DOCUMENTS

| | | | | |
|---|---|---|---|---|
| 2013/0168472 A1* | 7/2013 | Krichever | F23R 3/14 | 239/533.2 |
| 2013/0221138 A1* | 8/2013 | Rogler | F02M 51/06 | 239/585.5 |
| 2013/0233946 A1* | 9/2013 | Kobayashi | F02M 61/163 | 239/403 |
| 2013/0270369 A1* | 10/2013 | Peters | F02M 61/1866 | 239/533.2 |
| 2013/0292596 A1* | 11/2013 | Baumann | F16K 1/20 | 251/333 |
| 2014/0001288 A1* | 1/2014 | Albrodt | F02M 61/162 | 239/533.3 |
| 2014/0120265 A1* | 5/2014 | Larson | B05B 1/3046 | 427/372.2 |
| 2014/0332038 A1* | 11/2014 | Appelo | B01D 46/04 | 134/37 |
| 2014/0367601 A1* | 12/2014 | Rada | F16K 1/42 | 251/333 |
| 2015/0020778 A1* | 1/2015 | Upadhye | F02M 61/10 | 123/456 |
| 2015/0041567 A1* | 2/2015 | Derenthal | F02M 61/168 | 239/585.1 |
| 2015/0108246 A1* | 4/2015 | Stucchi | F02M 61/08 | 239/102.2 |
| 2015/0136877 A1* | 5/2015 | Sakata | F02M 61/184 | 239/584 |
| 2015/0377202 A1* | 12/2015 | Ishii | F02M 51/0671 | 239/584 |
| 2016/0025057 A1* | 1/2016 | Kato | F02M 61/1893 | 239/584 |

FOREIGN PATENT DOCUMENTS

| | | |
|---|---|---|
| JP | S48-100522 A | 12/1973 |
| JP | H06-207568 A | 7/1994 |
| JP | 2001-221135 A | 8/2001 |
| JP | 2002-364486 A | 12/2002 |
| JP | 2003-227436 A | 8/2003 |
| JP | 2004-504531 A | 2/2004 |
| JP | 2004-519621 A | 7/2004 |
| JP | 2008-069772 A | 3/2008 |
| JP | 2014-152695 A | 8/2014 |

OTHER PUBLICATIONS

Extended European Search Report issued in corresponding application No. 16 74 3079.2 dated Jun. 18, 2018.

* cited by examiner

FUEL INJECTION VALVE

TECHNICAL FIELD

The present invention relates to a fuel injection valve used for an internal combustion engine.

BACKGROUND ART

As an example of the related art, a fuel injection valve is disclosed in PTL 1, in which a valve body including a ball valve opening and closing an injection hole in an injection valve body is slidably incorporated, and between the injection valve body and the valve body, there are provided upper and lower valve guide portions including guide surfaces of the injection valve body, and sliding surfaces of the valve body sliding on the guide surfaces, a stopper of the injection valve body, and a flange of the valve body having an abutment surface formed to make abutment contact with the stopper upon opening the valve body, and in the fuel injection valve, the sliding surfaces on the upper and lower sides of the valve body are formed to have a substantially spherical shape, and clearances between the guide surfaces and the sliding surfaces in the upper and lower valve guide portions are set in a precise fitting condition without rattling.

When the valve body is slightly inclined relative to an inner peripheral surface of a core due to influence of an error in mounting the upper and lower valve guide portions, a sliding surface of a guide ring makes contact with a guide surface of the core, in which the sliding surface has a spherical shape, the guide ring constitutes the valve body, and the guide surface has a smooth shape. That is, the sliding surface of the guide ring has the spherical shape not distorted, and even if the valve body is inclined relative to the guide surface of the core, the guide ring constituting the valve body is slidably held in an axial direction. Thus, abrasion is hardly caused between the guide surface of the core and the sliding surface of the guide ring, and sliding resistance of the valve body can be inhibited from being changed with time. Accordingly, the ball valve as a component member of the valve body has little change in velocity opening and closing a fuel injection hole, and a fuel injection rate can be prevented from being changed with time.

In another example of the related art, a fuel injection valve is disclosed in PTL 2. The fuel injection valve is a fuel injector 1 made up of a nozzle body 2, and in the nozzle body 1, a valve needle 3 is positioned. This valve needle 3 is in operative connection with a valve-closing chain body 4, and this valve-closing chain body 4 cooperates with a valve-seat surface 6 disposed on a valve-seat member 5 to form a sealing seat. The fuel injection valve 1 according to an example illustrated in the figure includes at least one injection opening 7, and can be released inward. The valve-closure member 4 of fuel injector 1 designed according to the present invention which has a nearly spherical form is disclosed.

Thus, an offset-free cardanic valve-needle guidance is achieved, which provides for a precise functioning of the fuel injector 1.

CITATION LIST

Patent Literature

PTL 1: Publication of Patent No. 2003-227436
PTL 2: Publication of Patent No. 2004-519621

SUMMARY OF INVENTION

Technical Problem

In any of the fuel injection valves of the examples described in PTLs 1 and 2, it is described that the valve body has an end portion having a spherical shape, and formed with a guide portion and a seat portion with an injection hole cup, but a magnitude relationship between curvature radii and positions of centers of curvatures of the guide portion and a valve seat portion are not described.

Recent exhaust gas regulation requires reduction of an amount and quantity of particulate matter included in an exhaust gas, and a normal maximum fuel pressure may be increased to approximately 35 MP. When normal maximum fuel pressure is 35 MPa, the fuel injection valve is required to be operated for example at a pressure up to 45 MPa. In such a condition, a fluid force may exceed a valve opening force depending on a seat diameter, and the needle valve cannot be kept open and closed, when opening thereof is required.

Solution to Problem

In order to solve the above problems, a fuel injection valve according to the present invention includes a valve seat portion, a valve body which is seated on or separated from the valve seat portion, an injection hole which is formed on a downstream side from the valve seat portion, and a guide portion which is formed on an upstream side from the valve seat portion seating a valve body seat portion of the valve body to guide a guided portion on a downstream side of the valve body, in which the valve seat portion is formed to have a dimension in a crossing direction crossing an axial direction of 0.4 to 0.8 times a dimension of the guide portion in the crossing direction.

Advantageous Effects of Invention

According to the present invention, a fuel injection valve can be provided which is configured so that even if a fuel injection valve is required to be operated for example at a pressure up to 45 MPa, under a normal maximum fuel pressure of 35 MPa, a fluid force is not larger than a valve opening force, and a needle valve can be kept open when required.

DESCRIPTION OF EMBODIMENTS

Examples of the present invention are hereinafter described with reference to the drawings.

EXAMPLES

An internal combustion engine includes a fuel injection controller which performs calculation for appropriately converting an amount of fuel according to an operational state to an injection time of a fuel injection valve, and drives the fuel injection valve supplying fuel. The fuel injection valve is, for example, configured so that a armature includes a cylindrical armature, and a needle valve positioned at the center of the armature, a gap is provided between an end surface of a stator having a fuel introduction hole guiding fuel to a center portion, and an end surface of the armature, and an electromagnetic solenoid supplying a magnetic flux is provided in a magnetic passage including the gap. The magnetic flux passing through the gap generates a magnetic attraction force between the end surface of the armature and the end surface of the stator, and the magnetic attraction force attracts the armature toward the stator to drive the armature, and separates a valve body of the needle valve from a valve seat to open a fuel passage provided in the valve seat. An amount of fuel injected is mainly determined by a differential pressure between a fuel pressure and an peripheral pressure at an injection hole portion of the fuel injection valve, and a time period in which fuel is injected while the valve body is kept open.

When energization of the electromagnetic solenoid is terminated, magnetic attraction force acting on the armature disappears, the valve body and the armature are moved in a closing direction by a force of a resilient member urging the valve body in the closing direction, and a drop in pressure caused by a flow velocity of fuel flowing between the valve body and the valve seat, and the valve body is seated on the valve seat to close the fuel passage. The valve body and the valve seat are brought into abutment contact to seal fuel, and fuel is prevented from leaking from the fuel injection valve at unintended timing.

In recent years, from the viewpoint of reduction in amount of fuel consumed, attempts have been made to provide an internal combustion engine reducing an amount of exhaust gas in combination with a supercharger, using an operating range having a good heat efficiency, and reducing a fuel consumption upon being mounted on a vehicle. In particular, the attempts are effectively made in combination with a direct injection internal combustion engine by which improvement in amount of intake air to be filled by vaporization of fuel, and improvement in knock resistance are expected.

Furthermore, in a wide variety of types of vehicles, for considerable reduction in fuel consumption, demand for direct injection internal combustion engines is increased, and other devices effective for reduction in fuel consumption, such as recovery of regenerative energy, are required to be mounted to vehicles, and for reduction in total cost, reduction in cost of various devices is demanded, and further reduction in cost of fuel injection valves for direct injection is also demanded.

Meanwhile, further reduction of components contained in an exhaust gas from an internal combustion engine is demanded. Even if an extremely small amount of fuel leaks, while the internal combustion engine stops, the fuel remaining in a fuel rail connected to a fuel injection valve is supplied and accumulated in a combustion chamber including a piston and a cylinder in the internal combustion engine, and exhausted as an unburnt fuel component at next start of the internal combustion engine. In recent years, values stipulated by law have been strictly defined to a level at which such an extremely small amount of fuel does not satisfy the values stipulated by law. Minimization of fuel leakage to zero over a product lifetime has been demanded from fuel injection valves. Thus, a fuel injection valve is required to have a profile accuracy of abutment portions of a valve body and a valve seat of, for example, not more than 1 μm, for reduction in amount of fuel leaked from an end of the fuel injection valve.

In addition, for reduction in an amount and quantity of particulate matter contained in an exhaust gas, accurate injection of an extremely small amount of fuel per injection of 1 to 2 mg into a predetermined spray pattern of fuel is demanded from the fuel injection valve. For achieving smooth and stable movement of the valve body, a gap between the valve body and a guide member provided upstream from the valve seat to guide the valve body is, for example, only several micrometers.

Likewise, for reduction in an amount and quantity of particulate matter contained in an exhaust gas, attempts have been made to increase fuel injection pressure, for example, to approximately 35 MPa, from a fuel injection pressure of 20 MPa of a conventional fuel injection valve, reduce a drop size of fuel to be injected, and promote vaporization.

When increasing fuel pressure in use, a drop in pressure of fuel flowing downstream from a seat portion of the valve body increases, and a force closing the valve body (hereinafter, referred to as fluid force) increases. In order to maintain opening of the valve body under high fuel pressure, it is known that a diameter of the seat portion is effectively reduced to reduce the fluid force. Note that, when the valve body has a ball at an end, reduction of the seat diameter means reduction of a curvature of the ball at the end including the guide portion. When reducing a curvature radius of the ball forming the end portion of the valve body, an inner diameter of the guide portion of an injection hole cup guiding the valve body needs to be reduced with difficulty in machining and manufacture. In contrast, when increasing the seat diameter, an inner diameter of the guide portion of the injection hole cup needs to be increased, and when the injection hole cup has a restricted maximum dimensions, the inner diameter cannot be freely increased.

Although a detailed description will be given later, a fuel injection valve according to the present example have different curvature radii between a guide portion and a seat portion of a valve body, and centers of curvatures of the guide portion and the seat portion of the valve body are coincide with each other to freely design a diameter of the seat portion without depending on a diameter of the guide portion.

Accordingly, even if a fuel pressure is increased, the curvature radius of the seat portion can be reduced independently of the guide portion of the valve body, and a force generated by a difference in pressure of fluid at the seat portion can be reduced to keep the valve body open by a fuel pressure higher than a fuel pressure of a conventional fuel injection valve.

Figure 1:
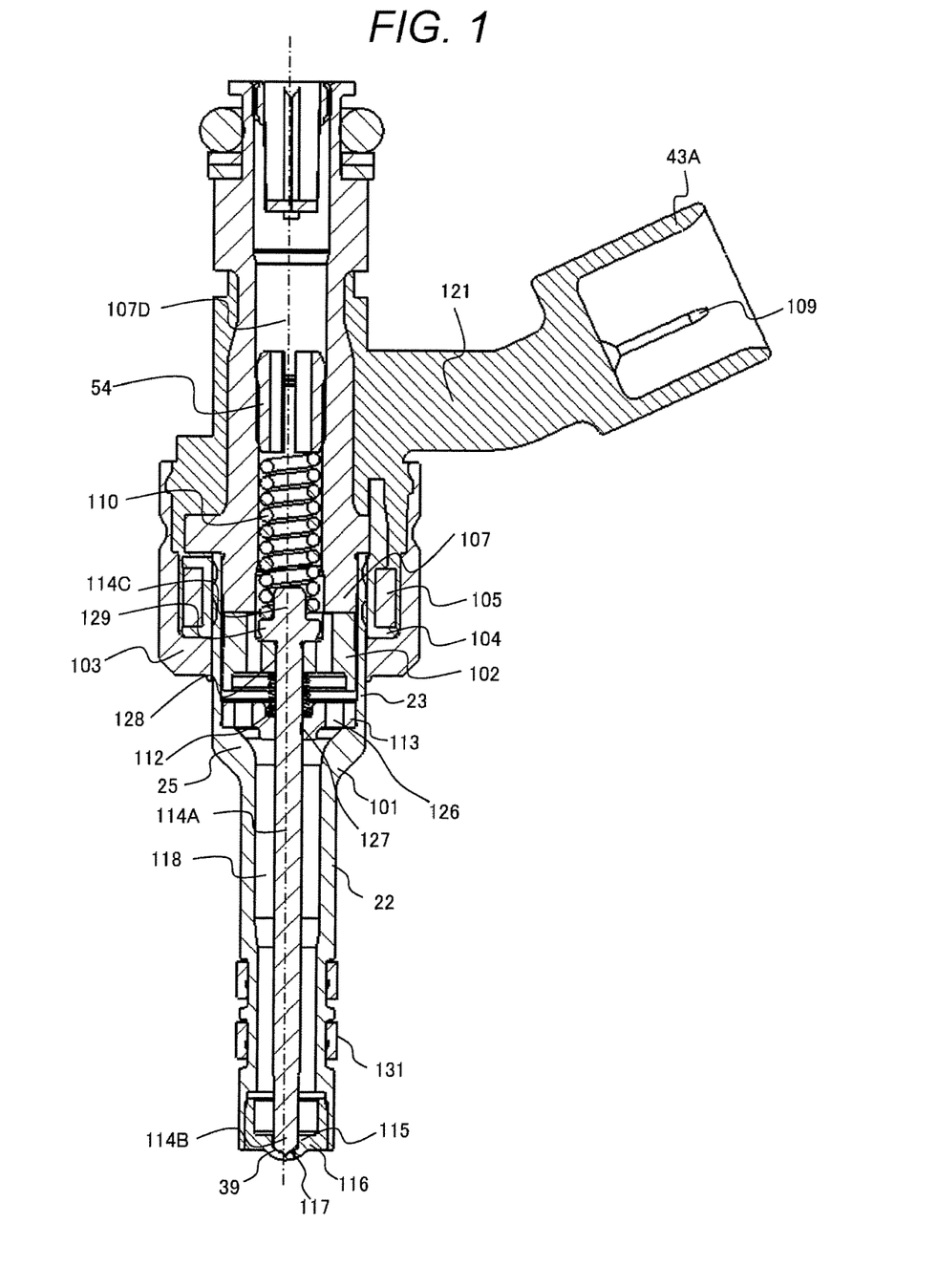
FIG. 1 is an overall cross sectional view of a fuel injection valve according to an embodiment of the present invention.

Furthermore, even if a large fuel injection rate is demanded from the fuel injection valve, the curvature radius of the seat portion can be increased independently of the guide portion of the valve body, and the inner diameter of the guide portion of the injection hole cup does not need to be changed. As described above, according to various demands for the fuel pressure or fuel injection rate, the fuel injection valve can be produced inexpensively. Hereinafter, a configuration of a fuel injection valve according to an example of the present invention will be described with reference to FIGS. 1 to 5, in comparison with a fuel injection valve according to the related art. FIG. 1 is a longitudinal cross-sectional view of a fuel injection valve according to an embodiment of the present invention. FIGS. 2 to 5 are partial enlarged views mainly illustrating an injection hole cup 116 and a valve body end portion 114B of FIG. 1, in which limited characteristic components of the fuel injection valve according to the present example are illustrated, and shapes thereof are simplified. In FIGS. 2 to 5, the sizes of components or sizes of gaps are exaggerated for easy understanding of operation or function, and unnecessary components are omitted for description of the function. In each embodiment, the same elements are denoted by the same reference signs, and repeated description will be omitted.

In FIG. 1, an injection hole cup-supporting body 101 includes a small-diameter cylindrical portion 22 having a small diameter, and a large-diameter cylindrical portion 23 having a large diameter. The injection hole cup (fuel injection hole-forming member) 116 including a guide portion 115 and a fuel injection hole 117 is inserted or press-fitted into an end portion of the small-diameter cylindrical portion 22, and an outer peripheral edge of an end surface of the injection hole cup 116 is circumferentially welded to be fixed to the small-diameter cylindrical portion 22. When a needle valve 114A provided at an end of a needle valve 114A constituting a armature, described later, is moved vertically in an axial direction of the fuel injection valve, the guide portion 115 functions to guide an outer periphery of the needle valve 114A. In the injection hole cup 116, a valve seat portion 39 of conical shape is formed on the downstream side from the guide portion 115. The needle valve 114A provided at the end of the needle valve 114A is brought into abutment contact with or separated from the valve seat portion 39, and fuel flow is blocked or guided to the fuel injection hole. A groove is formed in an outer periphery of the injection hole cup-supporting body 101, and a combustion gas sealing member as represented by a tip seal 131 made of resin is fitted into the groove.

At a lower end of an inner periphery of the large-diameter cylindrical portion 23 of the injection hole cup-supporting body 101, a needle valve guide member 113 guiding the needle valve 114A constituting the armature is fixedly fitted into a drawn portion 25 of the large-diameter cylindrical portion 23. A guide portion 127 guiding the needle valve 114A in the axial direction thereof is provided at the center of the needle valve guide member 113, and a plurality of fuel passages 126 are formed around the guide portion 127. A position of the needle valve 114A having an elongated shape is radially defined by the guide portion 127 of the needle valve guide member 113, and the needle valve 114A is guided to reciprocate linearly in the axial direction. Note that a valve opening direction is a direction oriented upward in a valve axial direction, and a valve closing direction is a direction oriented downward in the valve axial direction.

An end portion of the needle valve 114A, opposite to the end portion provided with the valve body end portion 114B, is provided with a head portion 114C having a stepped portion 129 having an outer diameter larger than a diameter of the needle valve 114A. An upper end surface of the stepped portion 129 is provided with a seat surface for a spring 110 urging the needle valve 114A in the valve closing direction, and the seat surface and the head portion 114C hold the spring 110.

The armature has a armature 102 including a through-hole 128 for passage of the needle valve 114A at the center. A zero spring 112 urging the armature 102 in the valve opening direction is held between the armature 102 and the needle valve guide member 113

A diameter of the through-hole 128 is smaller than a diameter of the stepped portion 129 of the head portion 114C, and under action of an urging force of the spring 110 pressing the needle valve 114A to the valve seat of the injection hole cup 116 or gravity, an upper side surface of the armature 102 held by the zero spring 112 and a lower end surface of the stepped portion 129 of the needle valve 114A are brought into abutment contact, and the armature 102 and the stepped portion 129 are engaged with each other. Therefore, the armature 102 and the stepped portion 129 are cooperatively operated corresponding to upward movement of the armature 102 against an urging force of the zero spring 112 or the gravity or downward movement of the needle valve 114A along the urging force of the zero spring 112 or the gravity. However, when a force moving the needle valve 114A upward and a force moving the armature 102 downward are independently act on the armature 102 and the stepped portion 129, regardless of the urging force of the zero spring 112 or the gravity, the armature 102 and the stepped portion 129 can be moved in different directions.

A fixed core 107 is press-fitted into an inner peripheral portion of the large-diameter cylindrical portion 23 of the injection hole cup-supporting body 101, and welded and joined at a press-fit contact position. This welding and joining seals a gap formed between an inside of the large-diameter cylindrical portion 23 of the injection hole cup-supporting body 101 and ambient air. At the center of the fixed core 107, a through-hole 107D having a diameter slightly larger than the diameter of the stepped portion 129 of the needle valve 114A is provided as a fuel instruction passage.

A lower end surface of the fixed core 107, an upper end surface and a collision end surface of the armature 102 may be plated to improve durability. When the armature includes a soft magnetic stainless steel having a relative softness, hard chromium plating or electroless nickel plating can be employed for securing reliable durability.

A lower end of the spring 110 for setting an initial load is in abutment contact with a spring-receiving surface formed on the upper end surface of the stepped portion 129 provided at the head portion 114C of the needle valve 114A, the other end of the spring 110 is received by an adjuster 54 press-fitted into the through-hole 107D of the fixed core 107, and the spring 110 is held between the head portion 114C and the adjuster 54. Adjustment of the fixed position of the adjuster 54 enables adjustment of the initial load of the spring 110 pressing the needle valve 114A against the valve seat portion 39.

A housing 103 having a cup shape is fixed to an outer periphery of the large-diameter cylindrical portion 23 of the injection hole cup-supporting body 101. A through-hole is provided at the center of a bottom portion of the housing 103, and the large-diameter cylindrical portion 23 of the injection hole cup-supporting body 101 is inserted through the through-hole. The housing 103 has an outer periphery wall, and an outer periphery yoke portion is formed on the outer periphery wall to face an outer peripheral surface of the large-diameter cylindrical portion 23 of the injection hole cup-supporting body 101. An electromagnetic coil 105 formed into an annular shape is disposed in a cylindrical space formed by the housing 103. The coil 105 includes an annular coil bobbin 104 having a groove of U-shaped cross-section opening radially outward, and a copper wire wound in the groove. A conductor 109 having rigidity is fixed at a winding start end and a winding finish end of the coil 105, and is drawn out from a through-hole provided in the fixed core 107. Outer peripheries of the conductor 109, the fixed core 107, and the large-diameter cylindrical portion 23 of the injection hole cup-supporting body 101 are molded in an insulating resin injected from an inner periphery of an upper end opening portion of the housing 103, and coated with a molded resin 121. As described above, a magnetic passage having a toroidal shape is formed around the electromagnetic coil (104, 105).

A plug supplying power from a high-voltage power supply or a battery power supply is connected to a connector 43A formed at an end of the conductor 109, and controlled between energization and non-energization by a controller not illustrated. During energization of the coil 105, a magnetic flux passing through an magnetic circuit 140 generates a magnetic attraction force between the armature 102 of the armature 114 and the fixed core 107 in a magnetic attraction gap, and the armature 102 is attracted with a force exceeding a set load of the spring 110 and moved upward. In this condition, the armature 102 engages with the head portion 114C of the needle valve, and moves upward with the needle valve 114A, until the upper end surface of the armature 102 collides with the lower end surface of the fixed core 107. Therefore, the valve body end portion 114B at the end of the needle valve 114A separates from the valve seat portion 39, and fuel passes through the fuel passage 118, and is ejected from the injection hole 117 at an end of the injection hole cup 116 into a combustion chamber of an internal combustion engine.

While the valve body end portion 114B at the end of the needle valve 114A is separated from the valve seat portion 39, and pulled upward, the needle valve 114A having the elongated shape is guided at two positions of the guide portion 127 of the needle valve guide member 113, and the guide portion 115 of the injection hole cup 116 to reciprocate linearly along the valve axial direction.

After de-energization of the electromagnetic coil 105, the magnetic flux is removed, and the magnetic attraction force in the magnetic attraction gap is also removed. In this condition, a spring force of the spring 110 setting the initial load pressing the head portion 114C of the needle valve 114A in the opposite direction exceeds the force of zero spring 112, and acts on the whole armature 114 (armature 102, needle valve 114A). Therefore, the armature 102 is pressed back by the spring force of the spring 110 to a valve closing position where the valve body end portion 114B makes contact with the valve seat portion 39.

While the valve body end portion 114B at the end of the needle valve 114A makes contact with the valve seat portion 39 at the valve closing position, the needle valve 114A having the elongated shape is guided only by the guide portion 127 of the needle valve guide member 113, and is not in contact with the guide portion 115 of the injection hole cup 116.

In this condition, the stepped portion 129 of the head portion 114C makes abutment contact with an upper surface of the armature 102 to move the armature 102 toward the needle valve guide member 113 against the force of the zero spring 112. When the valve body end portion 114B collides with the valve seat portion 39, the armature 102 separated from the needle valve 114A keeps moving toward the needle valve guide member 113 by an inertial force. At this time, friction is generated by fluid, between the outer periphery of the needle valve 114A and an inner periphery of the armature 102, and energy of the needle valve 114A, which rebounds from the valve seat portion 39 again in the valve opening direction, is absorbed. Since the armature 102 having a large inertial mass is separated from the needle valve 114A, and the rebound energy is reduced. Furthermore, the inertial force of the armature 102 absorbing the rebound energy of the needle valve 114A is reduced by the magnitude equal to the absorbed rebound energy, repulsion applied after compression of the zero spring 112 is also reduced, and a phenomenon that a rebound phenomenon of the armature 102 itself moves the needle valve 114A again in the valve opening direction is unlikely to occur. As described above, rebound of the needle valve 114A is minimized, and a phenomenon of unintentional fuel injection due to opening of the valve after de-energization of the electromagnetic coil (104, 105), so-called post injection phenomenon, is inhibited.

Figure 2:
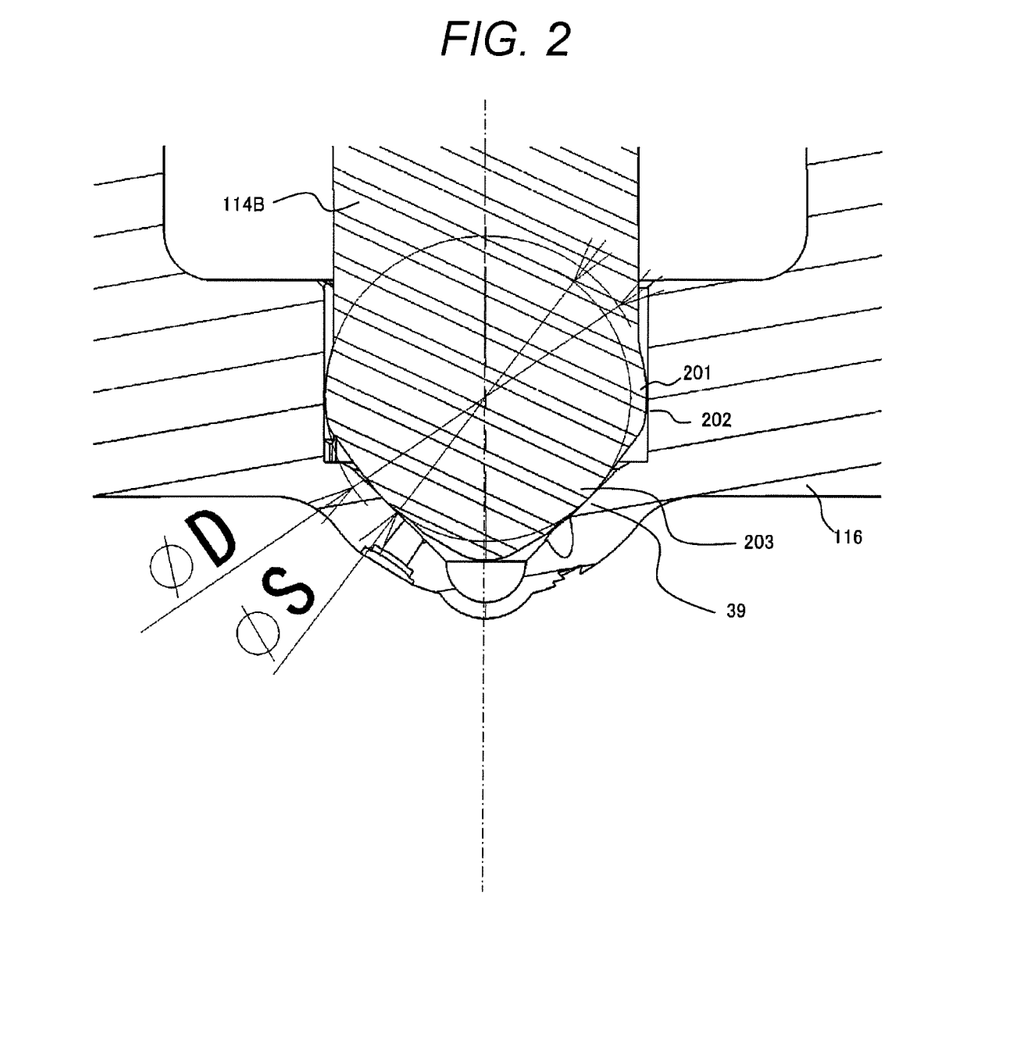
FIG. 2 is an enlarged cross-sectional view of an end portion of a fuel injection valve according to an embodiment of the present invention.
Figure 3:
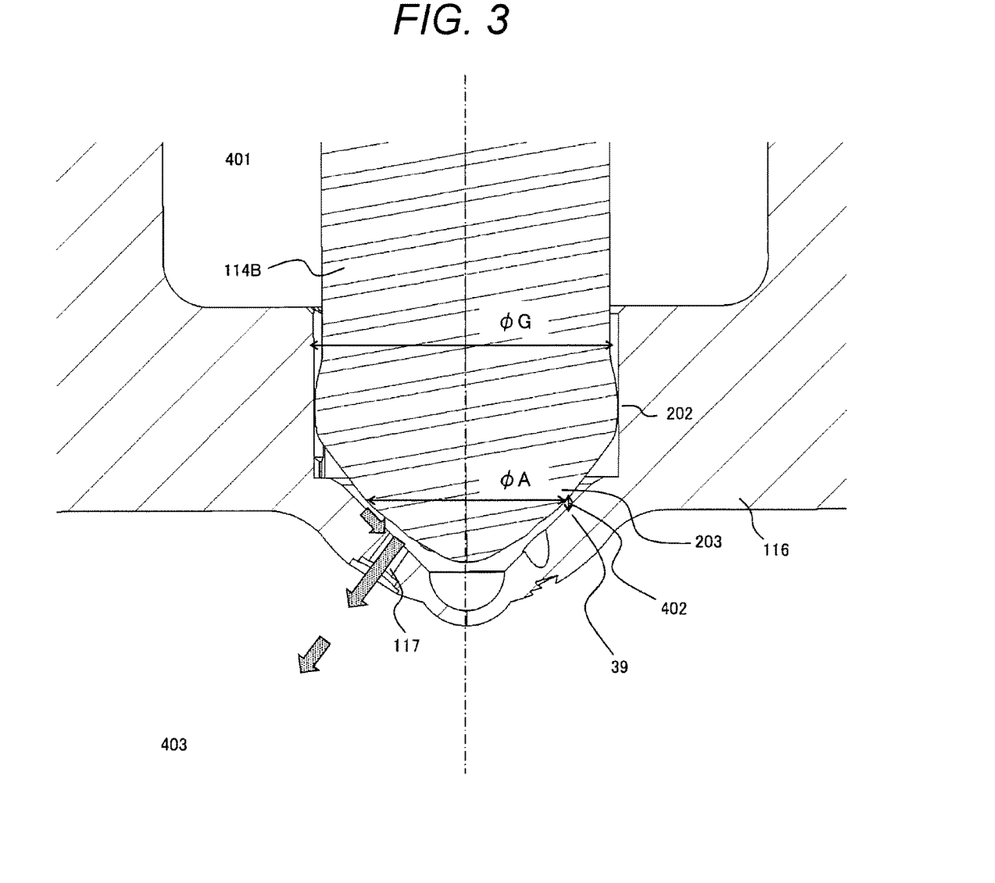
FIG. 3 is an enlarged cross-sectional view of an end portion of a fuel injection valve according to an embodiment of the present invention.

FIG. 2 is an enlarged cross-sectional view of an end of the fuel injection valve when the needle valve 114A is in a closed state. A slight gap is provided between a guided portion 201 of the valve body end portion 114B and a guide portion 202 of the injection hole cup 116, and when the armature illustrated in FIG. 3 is in an opened state, a position of the valve body end portion 114B is radially defined. The guided portion 201 of the valve body end portion 114B has a shape which is part of a spherical surface having a diameter φD. The valve body seat portion 203 of the valve body end portion 114B making abutment contact with the valve seat portion 39 of the injection hole cup 116 has a shape which is part of a spherical surface having a diameter φS.

FIG. 3 is an enlarged cross-sectional view of an end of the fuel injection valve when the needle valve 114A is in an opened state. An upstream portion 401 of the injection hole cup 116 is filled with fuel under high pressure (e.g., 20 MPa). A gap 402 is provided between the valve seat portion 39 of the injection hole cup 116 and the valve body seat portion 203 of the valve body end portion 114B. An external portion 403 from the injection hole cup 116 is under the pressure of a cylinder of the internal combustion engine, for example, approximately 0.1 MPa. A difference in pressure between the upstream portion 401 and the external portion 403, increases a flow velocity of fuel in the fuel injection valve, from a gap 402 to the injection hole 117, and the fuel flows out to the external portion 403. That is, in comparison with the upstream portion 401, in an area downstream from a seat diameter φA of the valve body end portion 114B, fuel pressure is considerably reduced, and a force (hereinafter, referred to as fluid force) obtained by multiplying an area of the seat diameter φA by a fuel pressure difference between the upstream portion 401 and the area downstream from the seat diameter φA is applied to the needle valve 114A in a downstream direction of FIG. 3.

Figure 6:
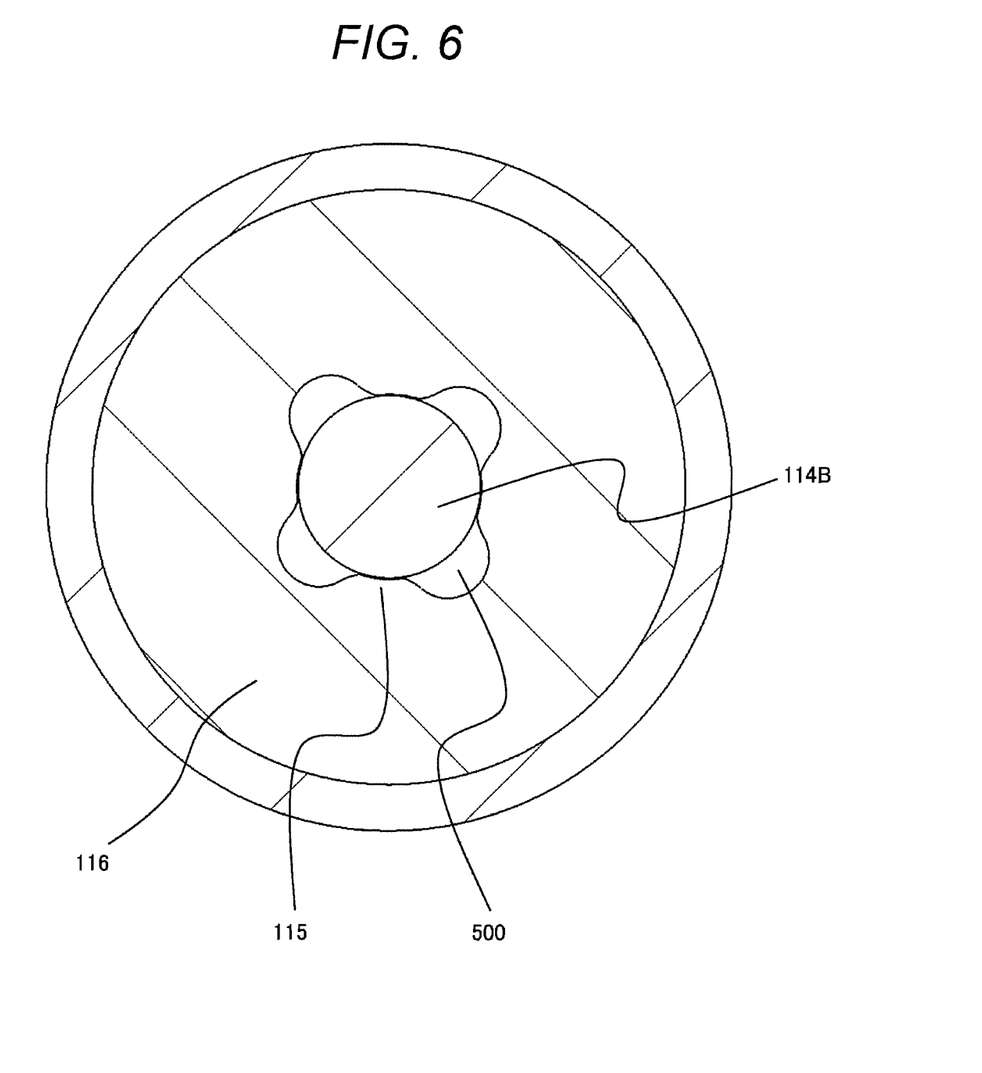
FIG. 6 is a transverse cross-sectional view of an end portion of a fuel injection valve according to an embodiment of the present invention.

FIG. 6 is a transverse cross-sectional view of an end portion of the fuel injection valve Fuel flowing near the valve body end portion 114B flows in an outer peripheral side flow passage 500, toward the downstream side of the valve body end portion 114B. The outer peripheral side flow passage 500 is located at a position corresponding to the guided portion 201 of the valve body end portion 114B in the axial direction, and is formed to be recessed to an inner peripheral side. Furthermore, the outer peripheral side flow passage 500 is formed between adjacent guided portions 201.

Figure 5:
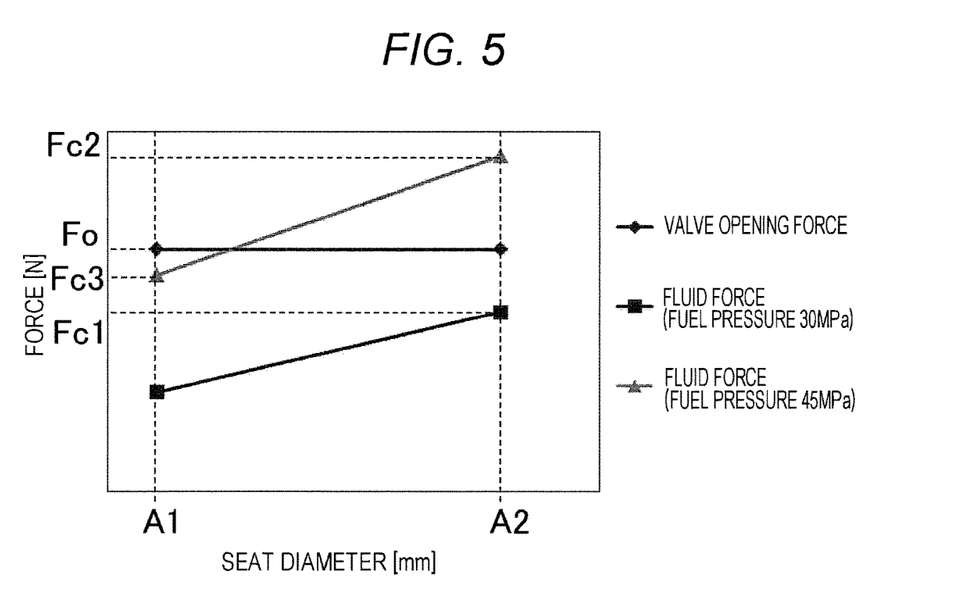
FIG. 5 is a graph illustrating a relationship between a seat diameter of a valve body and a fluid force.

FIG. 5 is a graph illustrating the fluid force generated while the valve body is opened, with respect to the diameter φA of the valve body seat portion 203 of the needle valve 114A. When a normal maximum fuel pressure is 20 MPa, the fuel injection valve is required to be operated for example at a pressure up to 30 MPa. When the seat diameter is φA2, the fluid force is Fc1, and the fluid force is smaller than a force Fo (hereinafter, referred to as valve opening force) obtained by subtracting the set load of the spring 110 from a force of the fixed core 107 attracting the armature 102 (hereinafter, referred to as magnetic attraction force), upon energization of the coil 105 of the fuel injection valve of FIG. 1, and the needle valve 114A can be kept open.

Meanwhile, the recent exhaust gas regulation requires reduction of the amount and quantity of particulate matter included in the exhaust gas, and the normal maximum fuel pressure may be increased to approximately 35 MP. When the normal maximum fuel pressure is 35 MPa, the fuel injection valve is required to be operated for example at a pressure up to 45 MPa. When the seat diameter is φA2, the fluid force is Fc2, and the fluid force is larger than the valve opening force Fo, and the needle valve 114A can not be kept open and closed.

In contrast, when the seat diameter is reduced from φA2 to φA1, an area of the seat diameter φA1 is also reduced, and the fluid force is reduced to Fc3. In this condition, the valve opening force Fo is larger than the fluid force Fc3, and the needle valve 114A can be kept open.

That is, the fuel injection valve according to the present example includes the valve seat portion 39, a valve body 114 which is seated on or separated from the valve seat portion 39, the injection hole 117 which is formed on a downstream side from the valve seat portion 39, and the guide portion 202 which is formed on an upstream side from the valve seat portion 39 seating the valve body seat portion 203 of the valve body 114 to guide the guided portion 201 on a downstream side of the guide valve body 114. Then the valve seat portion 39 is formed to have a dimension in a crossing direction crossing the axial direction of 0.4 to 0.8 times a dimension of the guide portion 202 in the crossing direction.

That is, as a result of an extensive study, the present inventors have found that when the dimension of the guide portion 202 in the crossing direction crossing the axial direction, that is, a diameter φG is set to 2 mm, and the dimension of the valve seat portion 39 in the crossing direction, that is, the diameter φA is set to 1.6 mm or less, and the needle valve 114A can be kept open, even if the maximum fuel pressure is approximately 35 MP.

Meanwhile, when the dimension of the valve seat portion 39 in the crossing direction, that is, the diameter φA is set to 0.8 mm or less, it is difficult to form the injection hole 117 in the injection hole cup 116. That is, the injection hole 117 is required to be formed in the injection hole cup 116, on an inner peripheral side from the valve seat portion 39, and it is difficult to form the injection hole 117, when the diameter φA is set to 0.8 mm or less.

Furthermore, when the seat diameter φA is too small, a contact area between the valve body seat portion 203 and the valve seat portion 39 is reduced, and the contact pressure is increased. When the contact pressure is large, a material having a high strength is required for the valve body seat portion 203 and the valve seat portion 39, and thus, this is not preferable from the viewpoint of inexpensive production of the fuel injection valve.

Note that, corresponding to the above configuration, the valve body seat portion 203 is formed to have a dimension (diameter) in the crossing direction crossing the axial direction of 0.4 to 0.8 times the dimension (diameter) of the guided portion 201 of the valve body 114 in the crossing direction.

The valve body seat portion 203 and the valve seat portion 39 preferably make a line contact, but microscopically make a surface contact. In this configuration, measurement of the seat diameter φA of the valve body seat portion 203 or the valve seat portion 39 is performed using a center portion of the surface contact, and thus, functions and effects according to the present example can be obtained. The same is applied to the dimension (diameter φG) of the guide portion 202 or the guided portion 201, and when a contact surface does not have linear contact, measurement is preferably performed using a center portion of the contact.

As described above, reduction of a diameter (twice curvature radius) of the spherical surface having the diameter φS forming the valve body seat portion 203 of the valve body end portion 114B reduces the seat diameter φA, and reduces the fluid force below the valve opening force, and thus, even under a high fuel pressure, the valve body can be kept open.

Furthermore, increase of the diameter of the spherical surface having the diameter φS forming the valve body seat portion 203 of the valve body end portion 114B, increases the seat diameter φA, and increases a flow passage area even if the valve body has an equal stroke, and an injection rate is further increased. Thus, the present invention is effective not only for keeping the valve body open under high fuel pressure, but also for increasing the injection rate.

Note that when the valve body seat portion 203 is formed to have a curvature radius of 0.7 to 1.5 times the curvature radius of the guided portion 201, corresponding to the above configuration, the seat diameter φA can be reduced or increased, independently of the guided portion 201, as in the above, and similar effects can be obtained.

Figure 4:
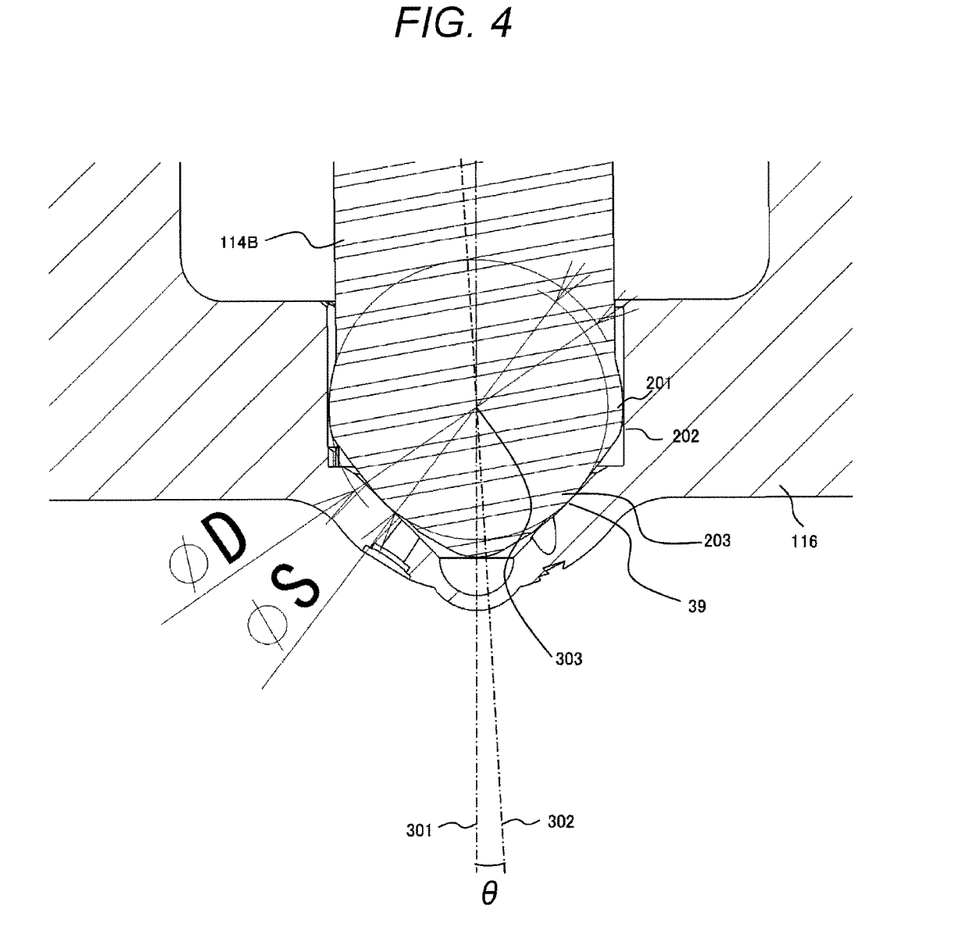
FIG. 4 is an enlarged cross-sectional view of an end portion of a fuel injection valve according to an embodiment of the present invention.

FIG. 4 is a schematic diagram illustrating a state in which the needle valve 114A of the fuel injection valve according to the present invention is slightly inclined in the fuel injection valve. The position of the needle valve 114A is restricted in a direction opposite to the injection hole cup 116, in the fuel injection valve, and radially restricted also, for example, in the guide portion 127 in FIG. 1. Components used for a fuel injection valve industrially have slight variation, and a valve body is slightly inclined in terms of accuracy in dimension and accuracy in assembly. When an axis of the guide portion 202 of the injection hole cup 116 is denoted by 301, and an axis of the needle valve 114A is denoted by 302, inclination between these two components is defined as θ. Note that, for convenience of understanding, θ in FIG. 3 is illustrated larger than actual inclination.

The valve body end portion 114B of the fuel injection valve according to the present invention is characterized in that the spherical surface diameter φD of the guided portion 201 and the spherical surface diameter φS of the valve body seat portion 203 have the same center portion 303. From this characteristic, the guided portion 201 and the valve body seat portion 203 have different spherical surface diameters, but are rotated around the same center portion 303 relative to the inclination θ of the needle valve 114A. That is, any of the valve body seat portion 203 and the guided portion 201 of the valve body 114 making abutment contact with the valve seat portion 39 has a spherical shape, and the curvature radius of the valve body seat portion 203 and the curvature radius of the guided portion 201 are formed to be different from each other. In addition, the centers of the curvature radii of the guided portion 201 and the valve body seat portion 203 are coincide with each other. Note that the injection hole 117 is formed in the injection hole cup 116 provided at a downstream end, and the guide portion 202 guiding the guided portion 201 on the downstream side of the valve body 114 is formed in the injection hole cup 116.

Even when the needle valve 114A is inclined by θ, the valve body seat portion 203 makes abutment contact with the valve seat portion 39 of the injection hole cup 116, on the spherical surface having a diameter φS, and seat performance is not influenced. Furthermore, the spherical surface having the diameter φD forming the guided portion 201 is also rotated around the center portion 303 the same as that of the spherical surface having a diameter φS of the valve body seat portion 203, and a distance between the guided portion 201 of the valve body and the guide portion 202 of the injection hole cup is not changed. Thus, it is prevented that the guided portion 201 and the guide portion 202 of the injection hole cup are brought into contact while the valve body is closed, a pressure generated between the valve body seat portion 203 of the valve body and the valve seat portion 39 of the injection hole cup 116 is considerably reduced, and fuel is slightly leaked.

When the guided portion 201 and the valve body seat portion 203 of the valve body end portion 114B have the same spherical surface diameter, reduction of the spherical surface diameter for keeping the valve body open under high fuel pressure requires reduction of the inner diameter φG of the guide portion 202 of the injection hole cup 116 illustrated in FIG. 3, but for example, when φG is approximately 2 mm, reduction of φG is difficult in maintenance of processing accuracy or removal of burr, processing cost increases, and increase in pressure of fuel to be used cannot be expensively handled.

In the valve body end portion 114B of the fuel injection valve according to the present example, the shapes of the guided portion 201 and the valve body seat portion 203 of the valve body end portion 114B are formed by external machining, and the spherical surface diameters thereof can be partially changed with minimal increase in processing cost. Therefore, provided is a fuel injection valve which is configured so that the seat diameter φA of the valve body seat portion 203 of the valve body end portion can be reduced to keep the valve body open under high fuel pressure, without changing the inner diameter φG of the guide portion 202 of the injection hole cup 116, in order to respond to high fuel pressure. In the fuel injection valve responding to high fuel pressure, it is prevented that the guided portion 201 and the guide portion 202 of the injection hole cup are brought into contact, relative to the inclination θ of the valve body, while the valve body is kept close, pressure generated between the valve body seat portion 203 of the valve body and the valve seat portion 39 of the injection hole cup 116 is considerably reduced, and fuel slightly leaks.

Note that the curvature radius of the valve body seat portion 203 is preferably not more than the curvature radius of the guided portion 201. This is because the curvature radius of the seat portion 203 of the valve body can be reduced to reduce a force generated due to a difference in pressure of fluid, generated at the seat portion, and even if the valve body is opened and held under a fuel pressure higher than that of a conventional one, an inner diameter of the guided portion 201 does not need to be reduced, and processability and manufacturing cost are similar to those of a conventional one, as described above with reference to FIG. 5.

According to experimental data of the inventors, it has been found that when the curvature radius of the valve body seat portion 203 is 0.85 to 0.95, and the curvature radius of the guided portion is 0.95 to 1.05, considerably preferable effects can be obtained.

It should be understood that the present example is not limited to the above embodiments. Furthermore, elements are not limited to the configurations described above, as long as the characteristic functions of the present example are not damaged.

REFERENCE SIGNS LIST 22 small-diameter cylindrical portion of injection hole cup-supporting body
23 large-diameter cylindrical portion of injection hole cup-supporting body
39 seat portion of seat member
43A connector
101 injection hole cup-supporting body
102 armature
103 housing
104 bobbin
105 solenoid
107 stator
107D stator through-hole (fuel passage)
109 conductor
110 spring
112 zero spring
113 shoulder portion
114A needle valve
114B valve body end portion
114C spring guide projection
115 guide region
116 injection hole cup
117 fuel injection hole
121 molded resin
126 fuel passage
127 guide portion
128 through-hole
136 gap
201 guided portion at end of valve body
202 guide portion of injection hole cup
203 valve body seat portion at end of valve body
301 axis of injection hole cup
302 axis of valve body
303 center of spherical surface diameter
401 upstream portion of injection hole cup
402 gap

The invention claimed is:
1. A fuel injection valve, comprising:
a valve seat portion;
a valve body which is seated on or separated from the valve seat portion, the valve body including a valve guided portion and a valve-body seat portion;
an injection hole which is formed on a downstream side from the valve seat portion; and
a guide portion which guides the valve guided portion on a downstream side of the valve body, the guide portion being formed on an upstream side from the valve seat portion with which the valve-body seat portion of the valve body makes abutment contact,
wherein the valve-body seat portion has a shape of a first spherical segment, and the valve guided portion has a shape of a second spherical segment, and
wherein a radius of curvature of the valve-body seat portion is different from a radius of curvature of the valve guided portion, and a center of the radius of curvature of the valve-body seat portion and a center of the radius of curvature of the valve guided portion coincide with each other.

2. The fuel injection valve according to claim 1, wherein the valve-body seat portion has a spherical surface diameter φS which is 0.4 to 0.8 times of a spherical surface diameter φD of the valve guided portion.

3. The fuel injection valve according to claim 1, wherein the injection hole is formed in an injection hole cup provided at a downstream end, and the guide portion guiding the valve guided portion on the downstream side of the valve body is formed in the injection hole cup.

4. The fuel injection valve according to claim 1, wherein the radius of curvature of the valve-body seat portion is 0.7 to 1.5 times the radius of curvature of the valve guided portion.

5. The fuel injection valve according to claim 1, wherein the radius of curvature of the valve-body seat portion is smaller than the radius of curvature of the valve guided portion.

6. A fuel injection valve comprising:
a valve seat;
a valve body which is seated on or separated from the valve seat, the valve body including a valve guided portion and a valve-body seat portion;
an injection hole which is formed on a downstream side of the valve seat; and
a guide portion which is formed on an upstream side from a valve seat portion of the valve seat seating the valve body to guide the valve guided portion on a downstream side of the valve body,
wherein the valve-body seat portion of the valve body abutting on the valve seat portion has a shape which is part of a spherical surface of a first sphere having a diameter φS, and the valve guided portion has a shape which is part of a spherical surface of a second sphere having a diameter φD, and
wherein a center of the first sphere and a center of the second sphere coincide with each other, and the diameter φS of the first sphere is different from the diameter φD of the second sphere.

7. The fuel injection valve according to claim 6, wherein the diameter φS is 0.4 to 0.8 times of the diameter φD.

8. The fuel injection valve according to claim 6, wherein the center of a curvature radius of the valve guided portion and the center of a curvature radius of the valve-body seat portion coincide with each other.

9. The fuel injection valve according to claim 6, wherein a curvature radius of the valve-body seat portion is 0.7 to 1.5 times a curvature radius of the valve guided portion.

10. The fuel injection valve according to claim 6, wherein a curvature radius of the valve-body seat portion is not larger than a curvature radius of the valve guided portion.

* * * * *